US 7,645,404 B2

(12) United States Patent
Paar et al.

(10) Patent No.: US 7,645,404 B2
(45) Date of Patent: Jan. 12, 2010

(54) METHOD FOR COATING METAL SURFACES

(75) Inventors: Uwe Paar, Kassel (DE); Stefan Sepeur, Wadgassen (DE); Stefan Goedicke, Neukirchen (DE); Kurt Steinhoff, Kleve (DE)

(73) Assignees: Volkswagen AG, Wolfsburg (DE); Nano-X GmbH, Saarbruecken (DE); Thyssenkrupp Steel AG, Duisburg (DE)

( * ) Notice: Subject to any disclaimer, the term of this patent is extended or adjusted under 35 U.S.C. 154(b) by 114 days.

(21) Appl. No.: 11/784,732

(22) Filed: Apr. 9, 2007

(65) Prior Publication Data

US 2007/0238257 A1 Oct. 11, 2007

Related U.S. Application Data

(63) Continuation of application No. PCT/EP2005/010622, filed on Oct. 1, 2005.

(30) Foreign Application Priority Data

Oct. 8, 2004  (DE)  ........................ 10 2004 049 413

(51) Int. Cl.
*B32B 15/01* (2006.01)
(52) U.S. Cl. ............... 264/134; 106/1.12; 106/1.17; 106/1.25; 106/1.29; 106/14.44; 106/287.14; 106/287.16
(58) Field of Classification Search ............ 106/1.12, 106/1.17, 1.25, 1.29, 14.44, 287.14, 287.16; 264/134
See application file for complete search history.

(56) References Cited

U.S. PATENT DOCUMENTS

| | | | |
|---|---|---|---|
| 4,188,458 A | | 2/1980 | Hugosson et al. |
| 4,477,517 A * | | 10/1984 | Rummel ............... 428/324 |
| 5,859,124 A | | 1/1999 | Yorifuji et al. |
| 6,008,285 A | | 12/1999 | Kasemann et al. |
| 6,403,164 B1 | | 6/2002 | Jonschker et al. |
| 6,695,904 B2 | | 2/2004 | Burger et al. |
| 6,713,559 B1 | | 3/2004 | Armbrust et al. |
| 6,875,479 B2 | | 4/2005 | Jung et al. |
| 7,449,241 B2 * | | 11/2008 | Gigliotti et al. ............. 428/413 |
| 2003/0041779 A1 | | 3/2003 | Burger et al. |
| 2004/0022950 A1 | | 2/2004 | Jung et al. |
| 2004/0043161 A1 | | 3/2004 | Sepeur et al. |
| 2004/0054044 A1 * | | 3/2004 | Bittner et al. ............... 524/261 |
| 2006/0214136 A1 * | | 9/2006 | Kurimoto et al. ........... 252/387 |

FOREIGN PATENT DOCUMENTS

| | | |
|---|---|---|
| DE | 104 314 | 3/1974 |
| DE | 198 13 709 A1 | 9/1999 |
| DE | 199 40 857 A1 | 3/2001 |
| DE | 100 27 265 A1 | 12/2001 |
| DE | 101 49 148 A1 | 5/2002 |
| DE | 100 39 404 A1 | 7/2002 |
| DE | 100 63 519 A1 | 7/2002 |
| DE | 101 61 383 | 8/2002 |
| DE | 101 41 687 A1 | 3/2003 |
| EP | 0 610 831 B1 | 8/1997 |
| EP | 0 839 895 B1 | 7/2002 |
| GB | 749641 | 5/1956 |
| JP | 3-291325 | 12/1991 |
| JP | 4-290580 | 10/1992 |
| JP | 2000-225374 | 8/2000 |
| JP | 2000-186234 | 7/2004 |
| SU | 1123815 A1 | 11/1984 |
| WO | WO 95/13326 | 5/1995 |
| WO | WO 2004/018732 A1 | 3/2004 |
| WO | 2006007985 A1 | 1/2006 |

OTHER PUBLICATIONS

"Product Data Sheet 86009", Glyptal Inc., 2 pages.*
Russian technical book, "Chemistry for Automobile Drivers", 1991, p. 245.

* cited by examiner

*Primary Examiner*—David M Brunsman

(57) ABSTRACT

A composition for producing a protective coat against scaling on metallic surfaces. The composition includes, as binders, hydrolysates/condensates of at least one silane or a silicone resin binder and also, further, at least one metallic filler.

32 Claims, No Drawings

METHOD FOR COATING METAL SURFACES

CROSS-REFERENCE TO RELATED APPLICATIONS

This is a continuation, under 35 U.S.C. § 120, of copending international application PCT/EP2005/010622, filed Oct. 1, 2005, which designated the United States; this application also claims the priority, under 35 U.S.C. § 119, of German patent application DE 10 2004 049 413.4, filed Oct. 8, 2004; the prior applications are herewith incorporated by reference in their entirety.

BACKGROUND OF THE INVENTION

Field of the Invention

The present invention relates to a method of coating metallic surfaces which involves applying to the surface at least one layer of a composition comprising hydrolysates/condensates of at least one silane or a silicone binder and also, if desired, a suitable solvent.

In light of the exacting safety requirements nowadays prevalent in vehicle construction, selected steel grades with high strengths are being used for load-bearing bodywork components and safety-relevant components such as side impact beams and reinforcements, for example.

In automobile construction at present certain components for particular vehicles are being manufactured, for example, from manganese-boron steel (22MnB5). With this grade of steel it is possible by hot work hardening to achieve strengths of up to 1650 MPa, as compared with conventional values of up to 1100 MPa that are typical of cold forming. In the case of hot forming, the steel is brought into the austenitic range by heating to 950° C. under a protective gas atmosphere (nitrogen) and then transferred to the forming die and formed. In the course of the operation, lasting just a few seconds, between removal from the furnace and forming having taken place, the steel component undergoes cooling to temperatures between 100-200° C. During this cooling procedure a high-strength martensitic microstructure is developed.

One problem associated with this operation is the scaling of the components, which occurs as soon as the component, which has been heated at 950° C., is taken from the gas-protected furnace and comes into contact with atmospheric oxygen. The layer of scale that is formed is irregular and brittle, comes off in flakes, and offers no basis for downstream operations such as welding, cathodic electrodeposition coating, etc., and is therefore removed by blasting before the component is processed further. This blasting operation, sometimes carried out by hand, is time-consuming and expensive and entails the formation of significant dirt and dust. Furthermore, fragments of the scale layer remain in the forming die and must be removed at regular intervals, with a significant labor effort and time consumption, something which goes very much against the execution of the desired piece rates and throughput rates in mass production. Consequently there exists a very strong demand for methods which, from the outset, prevent the scaling in the hot forming operation.

The state of the art method is that of aluminizing. In that surface protection method aluminum is incorporated into the surface of the steel. Aluminum-iron mixed crystals are formed which provide effective protection against scaling at up to 950° C. The aluminum, applied in liquid form by spraying or dipping, penetrates into the surface in the course of the subsequent homogenization. Spray aluminizing is employed wherever steel articles are subject to thermal scaling as a result of a high operating temperature and where, from an economic standpoint, carrying out manufacture from heat-resistant speciality materials does not appear justified. The protection against scaling that is provided by spray aluminizing derives from the inward diffusion of aluminum into the steel at temperatures of above 800° C., to form an iron-aluminum alloy. In other words, a layer decreasing in its aluminum content is formed between the aluminum on the surface and the ferrous base material. The iron-aluminum alloy thus formed is inherently more resistant to oxidation than steel itself, and, furthermore, in the course of use, the surface very quickly develops an $Al_2O_3$ skin, which is likewise highly heat-resistant and which prevents the rapid penetration of the oxygen to the iron. Parts treated in this way are being used by automakers in hot forming, with the aluminizing achieving effective protection against scaling. In some applications, however, a multiplicity of components having a higher degree of forming are being employed, with their forming being carried out in two steps. In the first step they are subjected to cold preforming, and in the subsequent hot forming step they are brought to the final geometry and simultaneously hardened. The aforementioned aluminized components cannot be employed in this case, since the cold forming operation is accompanied by damage to the layer, which is about 25-28 μm thick, for example; in the course of the subsequent hot forming, this leads to scaling at the damaged sites, and/or to instances of flaking.

U.S. Pat. No. 5,859,124 and European patent EP 0 839 895 B1 describe a lubricant for hot forming that comprises a mixture of alkali metal silicates, a further alkali metal compound, such as an alkali metal hydroxide, for example, water, and a fraction of up to 20% by weight of a silane coupling agent. The mixture is used as a lubricant in the production of seamless steel pipes by the Mannesmann process. High friction in the course of the production of the hollow body causes temperatures in the order of approximately 1000° C. or more to occur. The aforementioned lubricant mixture is said to produce an iron oxide film, which is said to protect the surfaces against the frictional forces that occur in the course of the forming operation.

Japanese patent abstract JP 3291325 describes a method intended to protect metallic surfaces from oxidation during hot rolling. It involves applying to the metallic surface a lubricant which comprises a glass component. That coating material comprises aluminum oxide, silicon oxide, and zircon oxide, has a melting point in the range of 900 and 1300° C., and is said to form a film having antioxidant properties on the metallic surface. The film is then removed, after rolling, by means of sandblasting, for example.

German published patent application DE 100 63 519 A1 and its corresponding U.S. patent publication US 2004/0043161 A1 describe a process for preparing low-solvent-content sol-gel systems by hydrolyzing or condensing a silane with alkoxides with addition of water, and separating off the condensate phase. The condensate phase is admixed with nanoparticles and the resulting dispersion can be applied by means of a wet-chemical application method such as spraying, dipping or rolling, for example, to any desired substrate. Substrates specified include, in particular, glass, ceramic, wood, stone, plastic, textiles, and paper, and metal too is mentioned. Application of the dispersion to the substrate can be followed by drying in the temperature range from 20 to about 500° C.

SUMMARY OF THE INVENTION

It is accordingly an object of the invention to provide a coating method for metallic surfaces which overcomes the above-mentioned disadvantages of the heretofore-known devices and methods of this general type and which enables the production of a more effective protective layer against scaling.

With the foregoing and other objects in view there is provided, in accordance with the invention, means for producing a protective coat against scaling on metallic surfaces, the means comprising: a composition with binders selected from the group consisting of hydrolysates/condensates of at least one silane or a silicone resin binder, and at least one metallic filler.

The present method is suitable particularly for the surface coating of a substrate whose surface is composed at least partly of steel. The method of the invention is intended in particular for the surface coating of substrates made of high-strength steel, and is suitable preferentially for the surface coating of a high-strength steel substrate which, following the surface coating, is subjected to a hot forming operation, in particular to hot forming at temperatures between 800° C. and about 1000° C., preferably at between about 880° C. and about 970° C.

The present invention relates to the production of a special protective layer which is applied in the form of a coating material to the steel and is subsequently dried or heat-cured at room temperature, and which effectively protects the coated parts against scaling in the hot forming operation at, for example, 950° C.

Application of the coating of the invention may also make sense in cases where no subsequent hot forming of the substrate is envisaged, for the purpose in particular of creating a corrosion control coat.

Surprisingly it has emerged that, through the combination of a binder and at least one metallic filler, a coating composition is obtained which can be applied in particular by wet-chemical means to a metallic surface and by means of which the metallic surface, especially a steel surface, can be protected effectively against scaling on contact with atmospheric oxygen, at temperatures of the kind which occur in the course of hot forming. One advantage of the invention, then, is that protection against scaling can be ensured readily by wet-chemical application and drying and/or heat curing of a paint-like coating composition.

This method can therefore be employed very flexibly; that is, the coating material can be applied at the premises of the coater or directly at the premises of the automaker, by means of spraying, rolling, flow coating, knifecoating, pressing or dipping, to almost any parts. A further advantage is that, on account of its outstanding adhesion, flexibility, and, preferably, low coat thickness, in the lower μm range, the coating material withstands cold and hot forming and is therefore ideally suited to the direct coating of steel coil on a coil coating line.

In accordance with the method of the invention it is possible to apply a coating film having a film thickness of for example less than about 30 μm, preferably less than about 10 μm. The surface coating of the invention may be followed for example by cathodic electrodeposition coating and/or phosphating. The starting point for the production of the coating film of the invention is, for example, at least one alkoxysilane, arylsilane and/or alkylsilane. By way of example, for the production of the coating film of the invention, a mixture comprising at least one alkylalkoxysilane and at least one alkoxysilane is hydrolyzed and/or condensed. The at least one silane or silane mixture, of the type specified above, for example, is preferably condensed and/or hydrolyzed in a weakly acidic solution. This can be done using, for example, a weak organic acid such as formic acid or the like. The procedure for producing said at least one coating film involves adding to the silane that is to be hydrolyzed, or to the silanes that are to be hydrolyzed and condensed, at least one metallic filler. The filler used may be in particular a metal pigment of one of the metals Al, Zn, Mg, Fe, and Sn, or of an alloy of one of these metals.

Instead of subjecting silanes to hydrolysis and/or condensation, it is also possible to use as the binder a silicone resin, dissolved beforehand in a solvent, the solids content of the solution being preferably between about 10% and about 90%. Solvents suitable in this context are preferably commercially customary alcohols, esters, ethers or hydrocarbons, benzines for example, with preference being given to the use of solvents having a flash point >23° C. Examples of suitable solvents include butyl glycol, 1-butanol, 1-methoxy-2-propanol or the like. The coating that is formed in particular after hot forming features adequate corrosion control for the further processing of the metallic substrates, especially steels. For example, subsequent phosphating and/or cathodic electrodeposition coating can take place by one of the methods that is common in the automobile industry.

It is also possible, where appropriate, to operate solventlessly, if using, for example, a silicone resin binder. In that case, the silicone resin can be processed similarly to a powder coating material.

The coating material can be cured by flashing off at room temperature or by accelerated curing at an elevated temperature, in which case temperatures of preferably up to 400° C. may be employed for the drying and curing of the coating. Accelerated curing by means for example of IR radiation, forced-air drying, UV irradiation or electron beam curing may also be useful. The coating can be applied not only to flat substrates but also to coils which are passing through a cold and/or hot forming step, or else the coating can be applied to steel substrates which have already undergone cold forming.

In accordance with one development of the invention, the coating composition network can be reinforced by means of nanoparticles, which are selected in particular from metal and nonmetal oxide particles having a size in the range of preferably between about 2 mm and 50 mm. Examples of substances suitable in this case are those such as AlOOH, corundum, zirconium oxide, $SiO_2$, $TiO_2$ or the like.

In accordance with one development of the invention, an additional modification to the coating composition may be useful, in which case, for hot and/or cold forming, this coating compound is admixed with a solid lubricant, such as a wax, stearate, graphite, $MoS_2$, boron nitride, aluminum oxide, titanium dioxide, a laminar pigment, mica for example, or the like. In addition it is possible where appropriate to add commercially customary rheological additives, examples being thixotropic agents, flow control agents or the like.

After drying and curing, in particular by heating at up to about 400° C., for example, a firmly adhering film is obtained on the substrate (steel strip, for example) and is flexible as a result of the organic components used. The preferably microscale fillers improve the lubricity effect even in the case of cold forming of a metallic substrate thus coated. In the case of further heating to temperatures of the kind commonly used for the hot forming of steel strip, the organic component (that is, the substituted organic radicals on the silanes) is burnt off to leave a vitreous matrix on the coated surface. Together with the fillers, this matrix bakes down to a firmly adhering, impervious coat. A metallic substrate having a surface coated in this way can thereafter be subjected to hot forming. As a result of its low film thickness and its intimate connection to the component and to the temperature-resistant fillers, the vitreous matrix remains formable, and the lubricity effect is retained. In the course of any aftertreatment of a substrate coated in this way, as for example in the course of cathodic electrodeposition coating, the metallic fillers in the coat contribute to the electrical conductivity that is necessary for the cathodic electrodeposition process.

The present invention further provides an automotive component, in particular a bodywork part, which has at least partly a surface coating produced by a method in accordance with the present invention. The method of the invention is especially suitable for the coating of load-bearing bodywork parts or safety-relevant parts such as, for example, side impact beams or reinforcements, for which selected high-strength steel grades are generally employed.

Other features which are considered as characteristic for the invention are set forth in the appended claims.

Although the invention is illustrated and described herein as embodied in a method for coating metal surfaces, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the following examples.

DESCRIPTION OF THE PREFERRED EMBODIMENTS

The present invention is illustrated below with reference to working examples. Described by way of example are three basic formulas for coating materials production, with the corresponding results:

Example 1

100 g of methyltriethoxysilane (MTEOS), 40 g of glycidyloxypropyl-triethoxysilane (GLYEO, Degussa) and 40 g of tetraethoxysilane (TEOS, Degussa) are admixed with 108 g of 5% strength formic acid and the mixture is stirred at room temperature overnight. Thereafter 50 g of Decomet Hochglanz Al 1002/10 high-gloss aluminum pigment paste from Schlenk are incorporated by stirring with a paddle stirrer, and, when the pigment is fully dispersed, 100 g of ethanol are added with stirring. Before further processing, the batch is admixed with 5 g of Byk Dynwet 800 wetting agent (from Byk Chemie).

The finished coating material is coated using a gravity feed spray gun (for example, Sata Jet, 1.4 mm nozzle) to a grease-free first-draw part, so that the entire surface is covered with a thin wet film. The coating film is left to flash off at room temperature for about 5 minutes and then, depending on the required abrasion resistance, either dried at room temperature for a further 30 minutes or cured at a temperature of 80-200° C. for 5-15 minutes.

Results:

After curing and return cooling to room temperature, the first-draw part is coated with a silvery coat approximately 2-6 μm thick which adheres firmly to the substrate (very good values in the crosshatch/tape test) and is also insensitive to firm scratching with the fingernail. The coated parts are insensitive to corrosion when stored in a dry atmosphere. Immediately after coating, however, and even after storage, the coated parts can be used directly in a hot forming operation and, even after contact with atmospheric oxygen at 950° C., exhibit no scaling whatsoever. At 950° C. a firmly adhering mixed oxide layer of iron, aluminum, silicon, and oxygen is formed, which is a suitable basis for the adhesion of a subsequent cathodic electrodeposition coat.

Example 2

A mixture of 120 g of methyltriethoxysilane (MTEOS) and 60 g of tetraethoxysilane (TEOS), obtained from Degussa-Hüls, is admixed with 108 g of 5% strength formic acid and the mixture is stirred at room temperature overnight. Thereafter 50 g of Decomet Hochglanz Al 1002/10 high-gloss aluminum pigment paste from Schlenk are incorporated by stirring with a paddle stirrer, and, when the pigment is fully dispersed, 150 g of N-methyl-2-pyrrolidone are added with stirring. Prior to further processing, the batch is admixed with 5 g of Byk 306 wetting agent (from Byk Chemie). As a solid lubricant, 5 g of molybdenum disulfide powder with a particle size <5 μm are added, and are incorporated homogeneously by dispersion using a dissolver at a speed of 1000 rpm, for 20 minutes.

The completed coating material is rolled onto a degreased steel strip on a coil coating line at a strip speed of 60 m/min, and cured at a temperature of 200-250° C.

Results:

After curing, the coil is covered with a homogeneous silvery coat with a thickness in the region of about 2-6 μm (adjustable), whose mechanical resistance is such that the steel strip can be wound up without damage to the coat and can be processed further by the usual methods. Sheet bar parts cut to size can be cold formed without damage to the coat at the bends, and then processed in a hot forming operation without scaling. At 950° C. a firmly adhering mixed oxide layer of iron, aluminum, silicon, and oxygen is formed, which is a suitable basis for the adhesion of a subsequent cathodic electrodeposition coat.

Example 3

A mixture of 120 g of methyltriethoxysilane (e.g. dynasylan MTES, Degussa) and 40 g of tetraethoxysilane (e.g. Dynasil A, Degussa), is admixed with 100 g of 1% strength trifluoroacetic acid and the mixture is stirred at room temperature overnight. Thereafter 150 g of the high-boiling solvent butyl glycol, 0.2 g of Disperbyk 180 dispersant (from Byk Chemie) and 35 g of Decomet 1006/30 aluminum pigment paste (from Schlenk) are added and are incorporated by stirring with a paddle stirrer. As a solid lubricant, 5 g of ground natural graphite with a particle size <5 μm are added. To set the required processing viscosity or thixotropy, 1 g of Aerosil 200 is added to the formulation. The fillers are incorporated homogeneously by dispersion using a dissolver at 1000 rpm, for 20 minutes.

The completed coating material is rolled onto a degreased steel strip on a coil coating line at a strip speed of 60 m/min, and cured at a temperature of 200-250° C.

Results:

After curing, the coil is covered with a homogeneous silvery coat with a thickness in the region of about 2-6 μm (adjustable), whose mechanical resistance is such that the steel strip can be wound up without damage to the coat and can be processed further by the usual methods. Sheet bar parts cut to size can be cold formed without damage to the coat at the bends, and then processed in a hot forming operation without scaling. At 950° C. a firmly adhering mixed oxide layer of iron, aluminum, silicon, and oxygen is formed, which is a suitable basis for the adhesion of a subsequent cathodic electrodeposition coat.

We claim:

1. A method of coating a metallic surface of a substrate, wherein the surface consists at least partially of steel, the method which comprises:
    applying a composition for producing a protective layer against scaling on the surface, the composition comprising binders selected from the group consisting of a silicone resin binder or of hydrolysates/condensates of at least one silane, and at least one metallic filler;
    subsequently drying and/or curing the coating; and
    subsequently subjecting the substrate to a hot-forming operation.

2. The method according to claim 1, wherein the composition further comprises at least one metal salt.

3. The method according to claim 1, wherein the hydrolysates/condensates of at least one silane are formed at least from one alkoxysilane, arylsilane, and/or alkylsilane.

4. The method according to claim 1, which comprises preliminarily dissolving the binder in a solvent.

5. The method according to claim 4, which comprises maintaining a solids content between about 10% and 90%.

6. The method according to claim 4, wherein the solvent is an alcohol, ester, ether or a hydrocarbon.

7. The method according to claim 6, wherein the solvent has a flash point >23° C.

8. The method according to claim 1, wherein the metallic filler is a metal pigment of a metal selected from the group consisting of Al, Zn, Mg, Fe, Sn, or an alloy of any one of these metals.

9. The method according to claim 1, wherein the composition comprises as metallic filler at least a metal pigment in an amount such that the curing of the coating results in a fraction of between 10% and 90% solids.

10. The method according to claim 1, wherein the composition comprises nanoparticles.

11. The method according to claim 1, wherein the composition comprises metallic and non-metallic nanoparticles having a particle size in a range between 2 nm and about 50 nm.

12. The method according to claim 1, wherein the composition comprises at least one solid lubricant.

13. The method according to claim 1, wherein the composition comprises at least one of a wax, stearate, graphite, $MoS_2$, boron nitride, aluminum oxide, titanium dioxide, or a laminar pigment.

14. The method according to claim 1, which comprises providing the composition with mica.

15. The method according to claim 1, which comprises providing the composition with rheological additives.

16. The method according to claim 15, wherein the rheological additives are selected from the group consisting of thixotropic agents and flow control agents.

17. The method according to claim 1, which comprises wet-chemically applying the coating composition to the surface of the substrate and subsequently curing the coating composition.

18. The method according to claim 1, which comprises surface-coating a substrate of high-strength steel.

19. The method according to claim 1, which comprises performing the hot forming operation at a temperature between about 800° C. and about 1000° C.

20. The method according to claim 19, which comprises hot forming at a temperature between 880° C. and 970° C.

21. The method according to claim 1, which comprises directly coating steel coils.

22. The method according to claim 21, which comprises implementing the method on a coil coating facility and directly coating the steel coils.

23. The method according to claim 1, which comprises applying a lacquer coating having a film thickness of less than about 30 μm.

24. The method according to claim 23, which comprises applying the lacquer coating with a film thickness of less than about 10 μm.

25. The method according to claim 23, which comprises subjecting the substrate with the lacquer coating to cold forming in at least one workstep.

26. The method according to claim 25, which comprises carrying out at least one cold forming step prior to a hot forming operation.

27. The method according to claim 1, which comprises curing the coating composition by flashing off at room temperature or at an elevated temperature of up to 400° C.

28. The method according to claim 1, which comprises curing the coating composition with an accelerated curing process relative to unassisted curing.

29. The method according to claim 28, which comprises selecting the accelerated curing process from the group consisting of IR radiation, forced-air drying, UV irradiation, and electron beam curing.

30. The method according to claim 1, which comprising following the surface coating process with at least one of cathodic electrodeposition coating and phosphating.

31. An automotive component, comprising a surface coating covering at least a part of a surface thereof and being produced by the method according to claim 1.

32. The automotive component according to claim 31, forming a body part for a motor vehicle.

* * * * *